United States Patent [19]

Tsugawa et al.

[11] Patent Number: 5,712,029
[45] Date of Patent: Jan. 27, 1998

[54] FRICTION MATERIAL

[75] Inventors: Kazuo Tsugawa; Seiji Suzuki; Hidekazu Kubono, all of Tokyo, Japan

[73] Assignee: Nisshinbo Industries, Inc., Tokyo, Japan

[21] Appl. No.: 706,967

[22] Filed: Sep. 3, 1996

Related U.S. Application Data

[63] Continuation of Ser. No. 365,607, Dec. 28, 1994, abandoned, which is a continuation-in-part of Ser. No. 234,114, Apr. 28, 1994, abandoned.

[51] Int. Cl.$^6$ ............................................. B32B 5/16
[52] U.S. Cl. .................... 428/323; 428/325; 428/328; 428/332; 428/364
[58] Field of Search ........................ 428/364, 372, 428/297, 687, 64, 70, 98, 114, 323, 325, 328, 332; 188/218 R, 218 L, 251 M, 250 R, 255, 257, 256, 251 A, 250 G, 71.1, 251 R, 250 B; 192/152, 153, 155, 156, 429, 145, 157, 134; 164/97, 461; 420/548, 549, 552; 252/12; 148/269, 513, 415; 75/255, 351, 684; 29/DIG. 48

[56] References Cited

U.S. PATENT DOCUMENTS

| | | | |
|---|---|---|---|
| 3,791,493 | 2/1974 | Yamaguchi et al. | 188/251 M |
| 3,885,959 | 5/1975 | Badia et al. | 75/138 |
| 4,438,004 | 3/1984 | Myers | 252/12 |
| 4,656,203 | 4/1987 | Parker | 523/155 |
| 4,722,949 | 2/1988 | Horiguchi et al. | 523/153 |
| 4,753,690 | 6/1988 | Wada et al. | 148/11.5 A |
| 4,815,572 | 3/1989 | Froberg et al. | 188/251 |
| 4,926,978 | 5/1990 | Shibata et al. | 188/73.1 |
| 5,007,508 | 4/1991 | Lacombe | 188/251 A |
| 5,028,494 | 7/1991 | Tsujimura et al. | 428/614 |
| 5,325,941 | 7/1994 | Farinacci et al. | 188/218 XL |

FOREIGN PATENT DOCUMENTS 6228539  5/1993  Japan.

*Primary Examiner*—Merrick Dixon
*Attorney, Agent, or Firm*—Kubovcik & Kubovcik

[57] ABSTRACT

A friction apparatus such as a brake or clutch includes a rotor formed from an aluminum alloy and hardened with a ceramic reinforcing material and a component such as a brake pad having a friction surface which incorporates a hard inorganic material which is an oxide, carbide, or nitride in an amount of 0.5 to 15% by volume. The reinforcing agent in the aluminum alloy and the hardening material in the friction material are selected to be compatible in accordance with the teachings of the specification.

10 Claims, No Drawings

FRICTION MATERIAL

This application is a continuation of application Ser. No. 08/365,607 filed Dec. 28, 1994, now abandoned, which application is a continuation-in-part of Ser. No. 08/234,114, filed Apr. 28, 1994, now abandoned.

FIELD OF THE INVENTION

The present invention relates to combinations of friction materials and hardened aluminum surfaces which are mutually compatible. The invention is applicable to disc and drum brakes and to clutches in the automotive and aircraft industries, and to machine tools generally. Selections of certain combinations of additives to the friction material and to the aluminum alloy have been found to provide an excellent coefficient of friction with low rates of wear to the friction material and to the aluminum surface.

PRIOR ART

Weight reduction is very desirable in the automotive industry and in the aircraft industry. The necessity for weight reduction in aircraft is obvious. Weight reduction in the automotive and trucking industries has become more important as the cost of fuel, the tax rate on the fuel and the stringency of environmental regulations increases. Historically, brake drums, brake rotors and flywheels have been formed of cast iron. Brake shoes, disc pads and clutches have been faced with compositions including binders, fillers, metal flakes and asbestos fibers. Various combinations have been employed to provide a suitable coefficient of friction at low temperatures while minimizing wear and fading tendencies at higher temperatures. The use of asbestos has diminished greatly in many countries as a result of environmental and occupational health regulations.

The desire to reduce unsprung weight and overall vehicle weight suggests that aluminum alloys would be a suitable substitute for cast iron. Unfortunately, aluminum alloys are softer than cast iron and the wear rates encountered when using conventional friction materials are unacceptable.

Aluminum alloys may be effectively hardened by adding particles or whiskers of ceramic materials such as SiC, $Al_2O_3$ or $ZrO_2$, but linings of the conventional type formed from a binder such as a phenolic resin, a filler such as graphite, barium sulfate, calcium carbonate and/or metal powder, and a fibrous material other than asbestos, i.e., organic fibers, glass fibers, or metallic fibers, are incompatible with the hardened aluminum alloys. Particularly, the coefficient of friction is too low or the rate of attack of the friction material on the aluminum is unacceptable. A different approach appears to be required.

BRIEF SUMMARY OF THE INVENTION

It has been found that friction materials which contain certain hard inorganic materials such as metal oxides, borides, carbides, and/or nitrides, such materials having a Mohs' hardness of 8 or greater, are especially compatible with aluminum alloy metal surfaces which are hardened with certain interstitial ceramic materials. The selection of the appropriate combination of ceramic hardening agent for the aluminum alloy and hard inorganic additive to the friction material follows a semi-empirical pattern.

DETAILED DESCRIPTION OF THE INVENTION

The friction material according to this invention is characterized by containing a hard, inorganic material in conjunction with binders, fillers and fibrous reinforcements characteristic of conventional friction materials.

The hard inorganic materials used in the friction material according to this invention, must have a Mohs' hardness of 8 or greater. The apparent reason for this requirement is that the hardening agents used in the compatible aluminum alloys have a comparable Mohs' hardness.

The hard inorganic material having a Mohs' hardness of 8 or more, can be a metal oxide, such as $ZrO_2$ or $Al_2O_3$, a boride such as $B_4C$, a carbide such as SiC or WC, a nitride, such as c-BN and mixtures thereof.

The hard inorganic material can be in the form of a powder, a particle or a whisker. Different forms are generally compatible.

The size of the hard inorganic material is preferably between 0.2 and 250 μm when the material is in the form of a powder or particle. Sizes smaller than 0.2 μm are not sufficiently abrasive and fail to provide a sufficiently high coefficient of friction. Sizes greater than 250 μm tend to be too abrasive and, more importantly, tend to gouge the surface of the aluminum material.

When the hard inorganic material is a whisker or fiber, suitable diameters are from 0.1 to 100 μm in lengths of 1 μm to 5 mm for reasons as described above.

The amount of the hard, inorganic material in the friction material is desirably about 0.1 to 30% by volume, preferably 0.5–15%. Amounts less than 0.1% do not achieve any significant improvement in the coefficient of friction. Amounts greater than 30% produce a roughness which exceeds the hardness improvement in the aluminum alloy as described below and cause excessive wear of the alloy.

The hardening or reinforcing material for the aluminum alloy is used in an amount of 35 vol % or less and, preferably, 15 to 25% vol %, and is a ceramic in the form of particles, whiskers or the like selected from $Si_3N_4$, TiN, TiC, $Al_2O_3$, SiC, $ZrO_2$, $SiO_2$ and mixtures thereof.

The formulation of the aluminum alloy containing the hardening or reinforcing material begins with a conventional aluminum alloy selected from those compositions disclosed in Japanese Industrial Standards and equivalent compositions well known to those in the art. A preferred aluminum alloy contains 65 vol % to 98 vol % of aluminum. The hardening material, in the form of particles, whiskers, or powders, can be added to the molten alloy or applied by procedures suitable for introducing ceramic particles into the surface of a pre-formed blank or partially machined material. For example, particles can be introduced using a plasma torch or by application of the particles, followed by scanning the surface with a laser. The particles do not become part of a liquid solution, but remains as discrete particles entrapped in the aluminum alloy matrix. These ceramic materials are the same as, or have properties similar to, the hard, inorganic materials used in the friction material. The following Tables illustrate the materials and the relationships in terms of percent by volume which produce the compatible hardened alloys and friction materials according to this invention.

TABLE 1A

| | | | |
|---|---|---|---|
| H in AR | $Si_3N_4$ | $Si_3N_4$ | $Si_3N_4$ |
| | 0.5–10 | 5–20 | 15–35 |
| H in FM | SiC | SiC | SiC |
| | 0.5–10 | 3–12 | 5–15 |
| H in AR | $Si_3N_4$ | $Si_3N_4$ | $Si_3N_4$ |
| | 0.5–10 | 5–20 | 15–35 |
| H in FM | $Al_2O_3$ | $Al_2O_3$ | $Al_2O_3$ |

TABLE 1A-continued

|  |  |  |  |
|---|---|---|---|
|  | 0.5~10 | 3~12 | 5~15 |
| H in AR | Si$_3$N$_4$ | Si$_3$N$_4$ | Si$_3$N$_4$ |
|  | 0.5~10 | 5~20 | 15~35 |
| H in FM | ZrO$_2$ | ZrO$_2$ | ZrO$_2$ |
|  | 1.0~10 | 3~12 | 5~15 |
| H in AR | Si$_3$N$_4$ | Si$_3$N$_4$ | Si$_3$N$_4$ |
|  | 0.5~10 | 5~20 | 15~35 |
| H in FM | B$_4$C | B$_4$C | B$_4$C |
|  | 0.5~10 | 3~12 | 5~15 |
| H in AR | Si$_3$N$_4$ | Si$_3$N$_4$ | Si$_3$N$_4$ |
|  | 0.5~10 | 5~20 | 15~35 |
| H in FM | c-BN | c-BN | c-BN |
|  | 0.5~10 | 3~12 | 5~15 |
| H in AR | Si$_3$N$_4$ | Si$_3$N$_4$ | Si$_3$N$_4$ |
|  | 0.5~10 | 5~20 | 15~35 |
| H in FM | WC | WC | WC |
|  | 0.5~10 | 3~12 | 5~15 |

TABLE 1B

|  |  |  |  |
|---|---|---|---|
| H in AR | TiN | TiN | TiN |
|  | 0.5~10 | 5~20 | 15~35 |
| H in FM | SiC | SiC | SiC |
|  | 0.5~10 | 3~12 | 5~15 |
| H in AR | TiN | TiN | TiN |
|  | 0.5~10 | 5~20 | 15~35 |
| H in FM | Al$_2$O$_3$ | Al$_2$O$_3$ | Al$_2$O$_3$ |
|  | 0.5~10 | 3~12 | 5~15 |
| H in AR | TiN | TiN | TiN |
|  | 0.5~10 | 5~20 | 15~35 |
| H in FM | ZrO$_2$ | ZrO$_2$ | ZrO$_2$ |
|  | 1.0~10 | 3~12 | 5~15 |
| H in AR | TiN | TiN | TiN |
|  | 0.5~10 | 5~20 | 15~35 |
| H in FM | B$_4$C | B$_4$C | B$_4$C |
|  | 0.5~10 | 3~12 | 5~15 |
| H in AR | TiN | TiN | TiN |
|  | 0.5~10 | 5~20 | 15~35 |
| H in FM | c-BN | c-BN | c-BN |
|  | 0.5~10 | 3~12 | 5~15 |
| H in AR | TiN | TiN | TiN |
|  | 0.5~10 | 5~20 | 15~35 |
| H in FM | WC | WC | WC |
|  | 0.5~10 | 3~12 | 5~15 |

TABLE 1C

|  |  |  |  |
|---|---|---|---|
| H in AR | TiC | TiC | TiC |
|  | 0.5~10 | 5~20 | 15~35 |
| H in FM | SiC | SiC | SiC |
|  | 1.0~10 | 3~12 | 5~15 |
| H in AR | TiC | TiC | TiC |
|  | 0.5~10 | 5~20 | 15~35 |
| H in FM | Al$_2$O$_3$ | Al$_2$O$_3$ | Al$_2$O$_3$ |
|  | 1.0~10 | 3~12 | 5~15 |
| H in AR | TiC | TiC | TiC |
|  | 0.5~10 | 5~20 | 15~35 |
| H in FM | ZrO$_2$ | ZrO$_2$ | ZrO$_2$ |
|  | 2~10 | 4~12 | 6~15 |
| H in AR | TiC | TiC | TiC |
|  | 0.5~10 | 5~20 | 15~35 |
| H in FM | B$_4$C | B$_4$C | B$_4$C |
|  | 1.0~10 | 3~12 | 5~15 |
| H in AR | TiC | TiC | TiC |
|  | 0.5~10 | 5~20 | 15~35 |
| H in FM | c-BN | c-BN | c-BN |
|  | 1.0~10 | 3~12 | 5~15 |
| H in AR | TiC | TiC | TiC |
|  | 0.5~10 | 5~20 | 15~35 |
| H in FM | WC | WC | WC |
|  | 1.0~10 | 3~12 | 5~15 |

TABLE 1D

|  |  |  |  |
|---|---|---|---|
| H in AR | Al$_2$O$_3$ | Al$_2$O$_3$ | Al$_2$O$_3$ |
|  | 0.5~10 | 5~20 | 15~35 |
| H in FM | SiC | SiC | SiC |
|  | 0.1~7 | 2~11 | 3~12 |
| H in AR | Al$_2$O$_3$ | Al$_2$O$_3$ | Al$_2$O$_3$ |
|  | 0.5~10 | 5~20 | 15~35 |
| H in FM | Al$_2$O$_3$ | Al$_2$O$_3$ | Al$_2$O$_3$ |
|  | 0.1~8 | 2~12 | 3~15 |
| H in AR | Al$_2$O$_3$ | Al$_2$O$_3$ | Al$_2$O$_3$ |
|  | 0.5~10 | 5~20 | 15~35 |
| H in FM | ZrO$_2$ | ZrO$_2$ | ZrO$_2$ |
|  | 0.5~10 | 2~12 | 5~15 |
| H in AR | Al$_2$O$_3$ | Al$_2$O$_3$ | Al$_2$O$_3$ |
|  | 0.5~10 | 5~20 | 15~35 |
| H in FM | B$_4$C | B$_4$C | B$_4$C |
|  | 0.1~8 | 2~12 | 3~15 |
| H in AR | Al$_2$O$_3$ | Al$_2$O$_3$ | Al$_2$O$_3$ |
|  | 0.5~10 | 5~20 | 15~35 |
| H in FM | c-BN | c-BN | c-BN |
|  | 0.1~8 | 2~12 | 3~15 |
| H in AR | Al$_2$O$_3$ | Al$_2$O$_3$ | Al$_2$O$_3$ |
|  | 0.5~10 | 5~20 | 15~35 |
| H in FM | WC | WC | WC |
|  | 0.1~7 | 2~11 | 3~12 |

TABLE 1E

|  |  |  |  |
|---|---|---|---|
| H in AR | SiC | SiC | SiC |
|  | 0.5~10 | 5~20 | 15~35 |
| H in FM | SiC | SiC | SiC |
|  | 0.1~8 | 2~12 | 3~15 |
| H in AR | SiC | SiC | SiC |
|  | 0.5~10 | 5~20 | 15~35 |
| H in FM | Al$_2$O$_3$ | Al$_2$O$_3$ | Al$_2$O$_3$ |
|  | 0.1~8 | 2~12 | 3~15 |
| H in AR | SiC | SiC | SiC |
|  | 0.5~10 | 5~20 | 15~35 |
| H in FM | ZrO$_2$ | ZrO$_2$ | ZrO$_2$ |
|  | 0.5~10 | 2~12 | 5~15 |
| H in AR | SiC | SiC | SiC |
|  | 0.5~10 | 5~20 | 15~35 |
| H in FM | B$_4$C | B$_4$C | B$_4$C |
|  | 0.1~8 | 2~12 | 3~15 |
| H in AR | SiC | SiC | SiC |
|  | 0.5~10 | 5~20 | 15~35 |
| H in FM | c-BN | c-BN | c-BN |
|  | 0.1~8 | 2~12 | 3~15 |
| H in AR | SiC | SiC | SiC |
|  | 0.5~10 | 5~20 | 15~35 |
| H in FM | WC | WC | WC |
|  | 0.1~8 | 2~12 | 3~15 |

TABLE 1F

|  |  |  |  |
|---|---|---|---|
| H in AR | ZrO$_2$—SiO$_2$ | ZrO$_2$—SiO$_2$ | ZrO$_2$—SiO$_2$ |
|  | 0.5~10 | 5~20 | 15~35 |
| H in FM | SiC | SiC | SiC |
|  | 0.1~5 | 2~8 | 3~12 |
| H in AR | ZrO$_2$—SiO$_2$ | ZrO$_2$—SiO$_2$ | ZrO$_2$—SiO$_2$ |
|  | 0.5~10 | 5~20 | 15~35 |
| H in FM | Al$_2$O$_3$ | Al$_2$O$_3$ | Al$_2$O$_3$ |
|  | 0.1~5 | 2~8 | 3~12 |
| H in AR | ZrO$_2$—SiO$_2$ | ZrO$_2$—SiO$_2$ | ZrO$_2$—SiO$_2$ |
|  | 0.5~10 | 5~20 | 15~35 |
| H in FM | ZrO$_2$ | ZrO$_2$ | ZrO$_2$ |
|  | 0.1~8 | 2~12 | 3~15 |
| H in AR | ZrO$_2$—SiO$_2$ | ZrO$_2$—SiO$_2$ | ZrO$_2$—SiO$_2$ |
|  | 0.5~10 | 5~20 | 15~35 |
| H in FM | B$_4$C | B$_4$C | B$_4$C |
|  | 0.1~5 | 2~8 | 3~12 |
| H in AR | ZrO$_2$—SiO$_2$ | ZrO$_2$—SiO$_2$ | ZrO$_2$—SiO$_2$ |
|  | 0.5~10 | 5~20 | 15~35 |
| H in FM | c-BN | c-BN | c-BN |
|  | 0.1~5 | 2~8 | 3~12 |

TABLE 1F-continued

| H in AR | $ZrO_2$—$SiO_2$ 0.5–10 | $ZrO_2$—$SiO_2$ 5–20 | $ZrO_2$—$SiO_2$ 15–35 |
|---|---|---|---|
| H in FM | WC 0.1–5 | WC 2–8 | WC 3–12 |

The symbol "H in AR" indicates the hard reinforcing material and its percentage in an aluminum rotor. The symbol "H in FM" indicates the hard inorganic material and its percentage in the friction material.

The following examples illustrate the effectiveness of the disclosed invention. The examples are purely illustrative and not limitative of the scope of the invention. Modifications to the invention which are apparent to those of skill in the art are included within the scope of the invention.

EXAMPLES 1–5 AND COMPARATIVE EXAMPLE 1

Friction materials of Examples 1–5 and Comparative Example 1 were produced under the following conditions.

Preliminary moldings:

room temperature, face pressure=400 kg/cm²

Hot pressing:

temp.=150° C., pressure=400 kg/cm², 10 minutes

Heat treatment: 180° C.×5 hours

The obtained friction materials were subjected to a friction test using a full-size dynamometer, under the following conditions:

Test method: JASO C427-83 I=5 kgms²

Rotor material: matrix=aluminum alloy of JIS AC8B

Reinforcing agent of rotor:

SiC particles of 15 μm, used in an amount of 20% by volume The results are shown in Table 1.

TABLE 1

| Composition of friction material (vol. %) | Examples | | | | | Comp Ex. |
|---|---|---|---|---|---|---|
| | 1 | 2 | 3 | 4 | 5 | 1 |
| Aramid fiber | 10 | 10 | 10 | 10 | 10 | 10 |
| Brass fiber | 10 | 10 | 10 | 10 | 10 | 10 |
| Phenolic resin | 20 | 20 | 20 | 20 | 20 | 20 |
| Graphite | 15 | 15 | 15 | 15 | 15 | 15 |
| Friction controlling agent | 20 | 20 | 20 | 20 | 20 | 20 |
| Inorganic filler (barium sulfate) | 10 | 10 | 10 | 10 | 10 | 10 |
| Inorganic filler (calcium carbonate) | 5 | 10 | 10 | 5 | 0 | 15 |
| Hard inorganic material | | | | | | |
| SiC particles (dia. = 1 μm) | 10 | | | 5 | 5 | |
| SiC particles (dia. = 15 μm) | | 5 | | | 5 | |
| $Al_2O_3$ particles (dia. = 15 μm) | | | 5 | | | |
| SiC whiskers | | | | 5 | 5 | |
| Friction test results | | | | | | |
| Friction coefficient (μ) | | | | | | |
| 100° C. | 0.36 | 0.38 | 0.37 | 0.38 | 0.41 | 0.21 |
| 200° C. | 0.41 | 0.37 | 0.38 | 0.43 | 0.43 | 0.24 |
| 300° C. | 0.38 | 0.36 | 0.36 | 0.37 | 0.38 | 0.28 |
| Wear amount (mm) | | | | | | |
| 100° C. | 0.3 | 0.4 | 0.3 | 0.3 | 0.3 | 0.8 |
| 300° C. | 0.5 | 0.3 | 0.5 | 0.2 | 0.1 | 1.4 |

TABLE 1-continued

| Composition of friction material (vol. %) | Examples | | | | | Comp Ex. |
|---|---|---|---|---|---|---|
| | 1 | 2 | 3 | 4 | 5 | 1 |
| Attack to opposite face (μm) | | | | | | |
| 100° C. | 2 | 3 | 2 | 2 | 1 | –5 |
| 300° C. | 1 | 2 | 3 | 4 | 2 | –16 |

In Table 1, a minus value indicates that in the attack to the opposing face powder is generated by wear and adhered onto said opposing face.

As is clear from Table 1, the friction materials of the present invention each containing a hard inorganic material show excellent coefficients of friction and excellent wear resistance over a wide temperature range and are superior in lack of attack to the opposing face. In contrast, the friction material of Comparative Example 1 is inferior in friction coefficient and wear resistance and was ground by the opposing face.

In addition to the materials which have been described above, it is understood that friction control agents including $MoS_2$, $Sb_2S_3$, $Sb_2O_3$, rubber powder, graphite, pulverized nutshells, and other additives known to those skilled in the art may be employed to provide the coefficient of friction required for a particular utilization. It is likewise understood that mechanical systems not related to the transportation industry may also find the combination of specified friction material and hardened aluminum alloy suitable for their uses.

We claim:

1. A friction apparatus comprising (1) an element comprising an aluminum alloy reinforced with at least one hard ceramic material, and (2) a friction material for friction coupling with said element and containing at least one hard material additive, wherein said aluminum alloy contains 65 volume % to 98 volume % of aluminum, and 0.5 volume % to 35 volume % of hard reinforcing material selected from the group consisting of $Si_3N_4$, TiN, TiC, $Al_2O_3$, SiC, $ZrO_2$, and $SiO_2$, and wherein said friction material contains 0.1 volume % to 30 volume % of a hard inorganic material selected from the group consisting of SiC, $Al_2O_3$, $ZrO_2$, $B_4C$, c-BN and WC.

2. A friction apparatus according to claim 1, wherein said hard inorganic material contained in said friction material has the form of a powder, particle or whisker.

3. A friction apparatus according to claim 1, wherein said hard inorganic material contained in the friction material has a Mohs hardness of at least 8.

4. A friction apparatus according to claim 1, wherein the hard inorganic material contained in the friction material is SiC.

5. A friction apparatus according to claim 1, wherein the hard inorganic material contained in the friction material is $Al_2O_3$.

6. A friction apparatus according to claim 1, wherein the hard inorganic material in the friction material is present in an amount of from 0.5 volume % to 15 volume %.

7. A braking apparatus comprising a rotor which is formed from an aluminum alloy hardened with between 0.5 volume % and 35 volume % of a material selected from the group consisting of $Si_3N_4$, TiN, TiC, $Al_2O_3$, SiC, $ZrO_2$, and $SiO_2$ and combinations thereof, and a stator for friction coupling with said rotor and having an outer surface having a friction material thereon, the friction material containing 0.5 volume % to 15 volume % of a hardening material selected from the group consisting of SiC, $Al_2O_3$, $ZrO_2$, $B_4C$, c-BN, and WC, wherein each relationship between the identity and amount in terms of volume % of a hardening agent in the rotor, H in AR, and the identity and amount in terms of volume % of a hardening material in the friction material, H in FM, is defined in Tables 1A, 1B, 1C, 1D, 1E, and 1F as follows:

TABLE 1A

| H in AR | $Si_3N_4$ | $Si_3N_4$ | $Si_3N_4$ |
|---|---|---|---|
|  | 0.5–10 | 5–20 | 15–35 |
| H in FM | SiC | SiC | SiC |
|  | 0.5–10 | 3–12 | 5–15 |
| H in AR | $Si_3N_4$ | $Si_3N_4$ | $Si_3N_4$ |
|  | 0.5–10 | 5–20 | 15–35 |
| H in FM | $Al_2O_3$ | $Al_2O_3$ | $Al_2O_3$ |
|  | 0.5–10 | 3–12 | 5–15 |
| H in AR | $Si_3N_4$ | $Si_3N_4$ | $Si_3N_4$ |
|  | 0.5–10 | 5–20 | 15–35 |
| H in FM | $ZrO_2$ | $ZrO_2$ | $ZrO_2$ |
|  | 1.0–10 | 3–12 | 5–15 |
| H in AR | $Si_3N_4$ | $Si_3N_4$ | $Si_3N_4$ |
|  | 0.5–10 | 5–20 | 15–35 |
| H in FM | $B_4C$ | $B_4C$ | $B_4C$ |
|  | 0.5–10 | 3–12 | 5–15 |
| H in AR | $Si_3N_4$ | $Si_3N_4$ | $Si_3N_4$ |
|  | 0.5–10 | 5–20 | 15–35 |
| H in FM | c-BN | c-BN | c-BN |
|  | 0.5–10 | 3–12 | 5–15 |
| H in AR | $Si_3N_4$ | $Si_3N_4$ | $Si_3N_4$ |
|  | 0.5–10 | 5–20 | 15–35 |
| H in FM | WC | WC | WC |
|  | 0.5–10 | 3–12 | 5–15 |

TABLE 1B

| H in AR | TiN | TiN | TiN |
|---|---|---|---|
|  | 0.5–10 | 5–20 | 15–35 |
| H in FM | SiC | SiC | SiC |
|  | 0.5–10 | 3–12 | 5–15 |
| H in AR | TiN | TiN | TiN |
|  | 0.5–10 | 5–20 | 15–35 |
| H in FM | $Al_2O_3$ | $Al_2O_3$ | $Al_2O_3$ |
|  | 0.5–10 | 3–12 | 5–15 |
| H in AR | TiN | TiN | TiN |
|  | 0.5–10 | 5–20 | 15–35 |
| H in FM | $ZrO_2$ | $ZrO_2$ | $ZrO_2$ |
|  | 1.0–10 | 3–12 | 5–15 |
| H in AR | TiN | TiN | TiN |
|  | 0.5–10 | 5–20 | 15–35 |
| H in FM | $B_4C$ | $B_4C$ | $B_4C$ |
|  | 0.5–10 | 3–12 | 5–15 |
| H in AR | TiN | TiN | TiN |
|  | 0.5–10 | 5–20 | 15–35 |
| H in FM | c-BN | c-BN | c-BN |
|  | 0.5–10 | 3–12 | 5–15 |
| H in AR | TiN | TiN | TiN |
|  | 0.5–10 | 5–20 | 15–35 |
| H in FM | WC | WC | WC |
|  | 0.5–10 | 3–12 | 5–15 |

TABLE 1C

| H in AR | TiC | TiC | TiC |
|---|---|---|---|
|  | 0.5–10 | 5–20 | 15–35 |
| H in FM | SiC | SiC | SiC |
|  | 1.0–10 | 3–12 | 5–15 |
| H in AR | TiC | TiC | TiC |
|  | 0.5–10 | 5–20 | 15–35 |

TABLE 1C-continued

| H in FM | $Al_2O_3$ | $Al_2O_3$ | $Al_2O_3$ |
|---|---|---|---|
|  | 1.0–10 | 3–12 | 5–15 |
| H in AR | TiC | TiC | TiC |
|  | 0.5–10 | 5–20 | 15–35 |
| H in FM | $ZrO_2$ | $ZrO_2$ | $ZrO_2$ |
|  | 2–10 | 4–12 | 6–15 |
| H in AR | TiC | TiC | TiC |
|  | 0.5–10 | 5–20 | 15–35 |
| H in FM | $B_4C$ | $B_4C$ | $B_4C$ |
|  | 1.0–10 | 3–12 | 5–15 |
| H in AR | TiC | TiC | TiC |
|  | 0.5–10 | 5–20 | 15–35 |
| H in FM | c-BN | c-BN | c-BN |
|  | 1.0–10 | 3–12 | 5–15 |
| H in AR | TiC | TiC | TiC |
|  | 0.5–10 | 5–20 | 15–35 |
| H in FM | WC | WC | WC |
|  | 1.0–10 | 3–12 | 5–15 |

TABLE 1D

| H in AR | $Al_2O_3$ | $Al_2O_3$ | $Al_2O_3$ |
|---|---|---|---|
|  | 0.5–10 | 5–20 | 15–35 |
| H in FM | SiC | SiC | SiC |
|  | 0.1–7 | 2–11 | 3–12 |
| H in AR | $Al_2O_3$ | $Al_2O_3$ | $Al_2O_3$ |
|  | 0.5–10 | 5–20 | 15–35 |
| H in FM | $Al_2O_3$ | $Al_2O_3$ | $Al_2O_3$ |
|  | 0.1–8 | 2–12 | 3–15 |
| H in AR | $Al_2O_3$ | $Al_2O_3$ | $Al_2O_3$ |
|  | 0.5–10 | 5–20 | 15–35 |
| H in FM | $ZrO_2$ | $ZrO_2$ | $ZrO_2$ |
|  | 0.5–10 | 2–12 | 5–15 |
| H in AR | $Al_2O_3$ | $Al_2O_3$ | $Al_2O_3$ |
|  | 0.5–10 | 5–20 | 15–35 |
| H in FM | $B_4C$ | $B_4C$ | $B_4C$ |
|  | 0.1–8 | 2–12 | 3–15 |
| H in AR | $Al_2O_3$ | $Al_2O_3$ | $Al_2O_3$ |
|  | 0.5–10 | 5–20 | 15–35 |
| H in FM | c-BN | c-BN | c-BN |
|  | 0.1–8 | 2–12 | 3–15 |
| H in AR | $Al_2O_3$ | $Al_2O_3$ | $Al_2O_3$ |
|  | 0.5–10 | 5–20 | 15–35 |
| H in FM | WC | WC | WC |
|  | 0.1–7 | 2–11 | 3–12 |

TABLE 1E

| H in AR | SiC | SiC | SiC |
|---|---|---|---|
|  | 0.5–10 | 5–20 | 15–35 |
| H in FM | SiC | SiC | SiC |
|  | 0.1–8 | 2–12 | 3–15 |
| H in AR | SiC | SiC | SiC |
|  | 0.5–10 | 5–20 | 15–35 |
| H in FM | $Al_2O_3$ | $Al_2O_3$ | $Al_2O_3$ |
|  | 0.1–8 | 2–12 | 3–15 |
| H in AR | SiC | SiC | SiC |
|  | 0.5–10 | 5–20 | 15–35 |
| H in FM | $ZrO_2$ | $ZrO_2$ | $ZrO_2$ |
|  | 0.5–10 | 2–12 | 5–15 |
| H in AR | SiC | SiC | SiC |
|  | 0.5–10 | 5–20 | 15–35 |
| H in FM | $B_4C$ | $B_4C$ | $B_4C$ |
|  | 0.1–8 | 2–12 | 3–15 |
| H in AR | SiC | SiC | SiC |
|  | 0.5–10 | 5–20 | 15–35 |
| H in FM | c-BN | c-BN | c-BN |
|  | 0.1–8 | 2–12 | 3–15 |
| H in AR | SiC | SiC | SiC |
|  | 0.5–10 | 5–20 | 15–35 |
| H in FM | WC | WC | WC |
|  | 0.1–8 | 2–12 | 3–15 |

TABLE 1F

| H in AR | ZrO$_2$—SiO$_2$ 0.5~10 | ZrO$_2$—SiO$_2$ 5~20 | ZrO$_2$—SiO$_2$ 15~35 |
|---|---|---|---|
| H in FM | SiC 0.1~5 | SiC 2~8 | SiC 3~12 |
| H in AR | ZrO$_2$—SiO$_2$ 0.5~10 | ZrO$_2$—SiO$_2$ 5~20 | ZrO$_2$—SiO$_2$ 15~35 |
| H in FM | Al$_2$O$_3$ 0.1~5 | Al$_2$O$_3$ 2~8 | Al$_2$O$_3$ 3~12 |
| H in AR | ZrO$_2$—SiO$_2$ 0.5~10 | ZrO$_2$—SiO$_2$ 5~20 | ZrO$_2$—SiO$_2$ 15~35 |
| H in FM | ZrO$_2$ 0.1~8 | ZrO$_2$ 2~12 | ZrO$_2$ 3~15 |
| H in AR | ZrO$_2$—SiO$_2$ 0.5~10 | ZrO$_2$—SiO$_2$ 5~20 | ZrO$_2$—SiO$_2$ 15~35 |
| H in FM | B$_4$C 0.1~5 | B$_4$C 2~8 | B$_4$C 3~12 |
| H in AR | ZrO$_2$—SiO$_2$ 0.5~10 | ZrO$_2$—SiO$_2$ 5~20 | ZrO$_2$—SiO$_2$ 15~35 |
| H in FM | c-BN 0.1~5 | c-BN 2~8 | c-BN 3~12 |

TABLE 1F-continued

| H in AR | ZrO$_2$—SiO$_2$ 0.5~10 | ZrO$_2$—SiO$_2$ 5~20 | ZrO$_2$—SiO$_2$ 15~35 |
|---|---|---|---|
| H in FM | WC 0.1~5 | WC 2~8 | WC 3~12 |

8. A braking apparatus according to claim 1, wherein the aluminum alloy is hardened with from 15 volume % to 25 volume % of SiC, and the friction material contains a hard material selected from the group consisting of SiC particles, Al$_2$O$_3$ particles, and SiC whiskers.

9. A friction apparatus according to claim 1, wherein the element is a rotor.

10. A friction apparatus according to claim 1, wherein the element is a drum.

* * * * *